United States Patent
Liaw

(10) Patent No.: US 9,245,342 B2
(45) Date of Patent: Jan. 26, 2016

(54) OBSTACLE DETECTION DEVICE

(71) Applicant: Altek Autotronics Corporation, Hsinchu (TW)

(72) Inventor: Ming-Jiun Liaw, Miaoli County (TW)

(73) Assignee: Altek Autotronics Corporation, Hsinchu (TW)

( * ) Notice: Subject to any disclaimer, the term of this patent is extended or adjusted under 35 U.S.C. 154(b) by 0 days.

(21) Appl. No.: 14/262,800

(22) Filed: Apr. 27, 2014

(65) Prior Publication Data

US 2015/0269732 A1    Sep. 24, 2015

(30) Foreign Application Priority Data

Mar. 19, 2014  (TW) .............................. 103110206 A

(51) Int. Cl.
*G06T 7/00* (2006.01)
*G06K 9/32* (2006.01)
*G06K 9/00* (2006.01)
*B60Q 9/00* (2006.01)

(52) U.S. Cl.
CPC .............. *G06T 7/0042* (2013.01); *B60Q 9/008* (2013.01); *G06K 9/00805* (2013.01); *G06K 9/3241* (2013.01); *G06T 7/0022* (2013.01); *G06T 7/0085* (2013.01); *G06T 2207/10016* (2013.01); *G06T 2207/30261* (2013.01)

(58) Field of Classification Search
CPC .... G06K 9/00805; B06R 1/00; B06R 23/205; B06R 2300/308

USPC .......................... 356/3.01–5.15; 348/148, 348
See application file for complete search history.

(56) References Cited

U.S. PATENT DOCUMENTS

| | | |
|---|---|---|
| 8,463,039 B2 | 6/2013 | Liu et al. |
| 2006/0256198 A1* | 11/2006 | Nishiuchi .................... 348/148 |
| 2011/0234804 A1* | 9/2011 | Matsuda et al. ............... 348/148 |
| 2012/0069185 A1 | 3/2012 | Stein |
| 2012/0162415 A1 | 6/2012 | Wu et al. |

\* cited by examiner

*Primary Examiner* — Luke Ratcliffe
(74) *Attorney, Agent, or Firm* — Jianq Chyun IP Office

(57) ABSTRACT

An obstacle detection device is provided, which includes a storage unit, a quasi-vertical edge detection module, an intersection determination module, a position determination module, and an obstacle detection module. The quasi-vertical edge detection module receives an input image and performs a quasi-vertical edge detection procedure on the input image to obtain a plurality of quasi-vertical edges. The intersection determination module determines whether the quasi-vertical edges intersect a predetermined virtual horizontal. If one of the quasi-vertical edges intersects the predetermined virtual horizontal, the position determination module determines whether an end of one of the quasi-vertical edges intersecting the predetermined virtual horizontal is located in a detection zone. If one end of one of the quasi-vertical edges intersecting the predetermined virtual horizontal is located in the detection zone, the obstacle detection module determines that an obstacle exists and issues a warning.

9 Claims, 7 Drawing Sheets

OBSTACLE DETECTION DEVICE

CROSS-REFERENCE TO RELATED APPLICATION

This application claims the priority benefit of Taiwan application serial no. 103110206, filed on Mar. 19, 2014. The entirety of the above-mentioned patent application is hereby incorporated by reference herein and made a part of this specification.

BACKGROUND OF THE INVENTION

1. Field of the Invention

The invention relates to an obstacle detection device and more particularly relates to an obstacle detection device based on image processing technology.

2. Description of Related Art

Due to the growing number of motor vehicles, the probability of road accidents increases year by year. In addition to the improvement in vehicle power, driving safety is another issue that needs to be focused on in the field of vehicle technology. There is research showing that, if the driver receives a warning before collision, the probability of accident can be significantly reduced. Therefore, a good and accurate obstacle detection and warning system plays a very important role in the current vehicle safety system.

Generally speaking, radar or ultrasound systems have been widely applied in today's vehicle safety system. However, sometimes radar or ultrasound systems may not be able to identify the environment, which lowers the identification rate. Moreover, the electromagnetic power of the radar or ultrasonic systems may also influence the human body. On the other hand, due to the progress in image processing and camera sensing technology, it is becoming more and more common to utilize images for obstacle detection. Many image-type safety warning systems remind the driver to keep a safe distance during driving by identifying the obstacles in the image. However, different image processing and analysis methods achieve different system performances, such as different identification accuracy or different computing time, etc. Thus, how to provide a highly-accurate obstacle detection system based on image processing is a concern of persons skilled in the art.

SUMMARY OF THE INVENTION

The invention provides an obstacle detection device which timely provides an accurate obstacle warning to a driver by improving the accuracy of image detection and obstacle identification.

The invention provides an obstacle detection device, which includes a storage unit, a quasi-vertical edge detection module, an intersection determination module, a position determination module, and an obstacle detection module. The storage unit at least stores an image. The quasi-vertical edge detection module is coupled to the storage unit, and receives an input image and performs a quasi-vertical edge detection procedure on the input image to obtain a plurality of quasi-vertical edges. The intersection determination module determines whether the quasi-vertical edges intersect a predetermined virtual horizontal. If one of the quasi-vertical edges intersects the predetermined virtual horizontal, the position determination module determines whether an end of one of the quasi-vertical edges intersecting the predetermined virtual horizontal is located in a detection zone. If one end of one of the quasi-vertical edges intersecting the predetermined virtual horizontal is located in the detection zone, the obstacle detection module determines that an obstacle exists and issues a warning.

In an embodiment of the invention, the quasi-vertical edge detection module includes a first direction edge detection and a second direction edge detection to obtain a plurality of first direction edges and a plurality of second direction edges. The quasi-vertical edge detection module obtains the quasi-vertical edges according to an angle relationship between the first direction edges and the second direction edges.

In an embodiment of the invention, the quasi-vertical edge detection module groups the quasi-vertical edges that are close to each other.

In an embodiment of the invention, the first direction edge detection of the quasi-vertical edge detection module is a horizontal edge detection and the second direction edge detection is a vertical edge detection.

Further, the invention provides an obstacle detection device, including a storage unit, a quasi-vertical edge detection module, a quasi-vertical edge tracking module, a slope variation calculation module, and an obstacle detection module. The storage unit at least stores a video stream including a plurality of images. The quasi-vertical edge detection module is coupled to the storage unit to receive an input image of the video stream and perform a quasi-vertical edge detection procedure on the input image to obtain a plurality of quasi-vertical edges. The quasi-vertical edge tracking module is coupled to the quasi-vertical edge detection module and continuously tracks the quasi-vertical edges for a tracking period respectively. The slope variation calculation module compares a slope variation value of each of the quasi-vertical edges in the tracking period and determines whether the slope variation value is smaller than a threshold value. The obstacle detection module determines that an obstacle exists and issues a warning if one of the slope variation values is smaller than the threshold value.

In an embodiment of the invention, the quasi-vertical edge detection module includes a first direction edge detection and a second direction edge detection to obtain a plurality of first direction edges and a plurality of second direction edges. The quasi-vertical edge detection module obtains the quasi-vertical edges according to an angle relationship between the first direction edges and the second direction edges.

In an embodiment of the invention, the quasi-vertical edge detection module groups the quasi-vertical edges that are close to each other and have similar slopes.

In an embodiment of the invention, the first direction edge detection of the quasi-vertical edge detection module is a horizontal edge detection and the second direction edge detection is a vertical edge detection.

Based on the above, in an embodiment of the invention, the obstacle detection device performs the quasi-vertical edge detection procedure on the input image to obtain the quasi-vertical edges. Furthermore, the obstacle detection device detects edges that are similar to the vertical line or completely vertical by edge detection of different directionality. Accordingly, by determining whether the quasi-vertical edges generated by quasi-vertical detection intersect the horizontal to perform the obstacle detection, the accuracy of obstacle identification is further improved and misjudgment is reduced to increase the safety of the driver.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated

DESCRIPTION OF THE EMBODIMENTS

Figure 1:
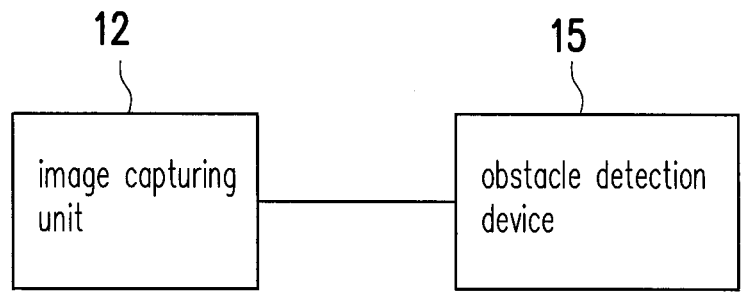
FIG. 1 is a schematic diagram illustrating an obstacle detection system of the invention.

FIG. 1 is a schematic diagram illustrating an obstacle detection system of the invention. With reference to FIG. 1, an obstacle detection system 10 includes an image capturing unit 12 and an obstacle detection device 15. The obstacle detection system 10 is adapted for a vehicle, and the image capturing unit 12 is disposed on the vehicle for capturing an image of an environment around the vehicle. For example, the image capturing unit 12 may be disposed in front of the vehicle, e.g. above a windshield of the vehicle, to capture an image of a road/lane before the vehicle. The image capturing unit 12 is an image sensor including a charge coupled device (CCD) or a complementary metal-oxide semiconductor (CMOS), for example, for capturing the image of the environment around the vehicle. More specifically, the image capturing unit 12 is a driving video camera provided with video recording equipment or a digital camera having a video recording function, for example. However, it is noted that the invention is not limited to the above.

The obstacle detection device 15 is an electronic device having an image processing function, which may be embodied as a computer, a vehicle computer, or other vehicle electronic devices. The obstacle detection device 15 is directly or indirectly connected with the image capturing unit 12 to receive an image or video stream captured by the image capturing unit 12. Accordingly, the obstacle detection device 15 is capable of detecting an obstacle and issuing a warning based on the image or video stream captured by the image capturing unit 12. In the embodiments of the invention, the obstacle detection device 12 performs obstacle detection based on edge information in the image. Particularly, it is noted that the obstacle detection device 15 performs a quasi-vertical edge detection so as to detect a quasi-vertical edge with an edge direction similar to a vertical direction in the image.

Based on the principle that obstacles block the horizontal in the vision of the driver, in an embodiment of the invention, the obstacle detection device 15 determines whether the quasi-vertical edge in the image intersects a virtual horizontal in the image so as to determine whether any obstacle exists around the vehicle. In addition, in another embodiment of the invention, the obstacle detection device 15 further distinguishes a profile of the obstacle from a lane line on the road according to a slope variation of the quasi-vertical edge in the video stream. Several embodiments are given below to explain in detail how to perform obstacle detection according to the quasi-vertical edge obtained by the quasi-vertical edge detection in the invention.

Figure 2:
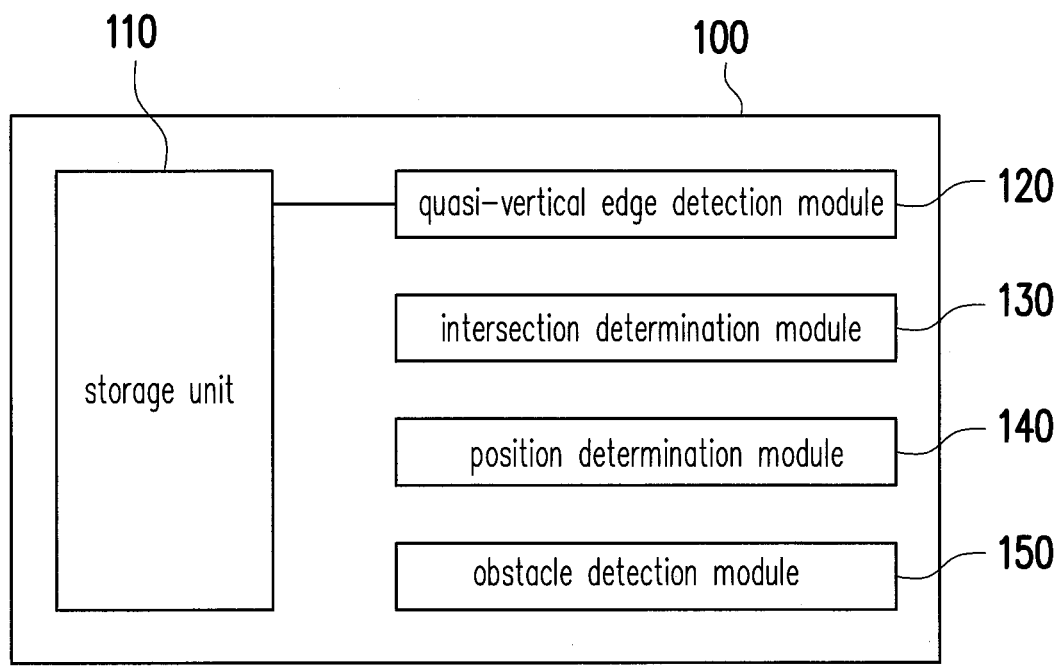
FIG. 2 is a block diagram illustrating an obstacle detection device according to an embodiment of the invention.

FIG. 2 is a block diagram illustrating an obstacle detection device according to an embodiment of the invention. With reference to FIG. 2, an obstacle detection device 100 includes a storage unit 110, a quasi-vertical edge detection module 120, an intersection determination module 130, a position determination module 140, and an obstacle detection module 150. The storage unit 110 is a random access memory, a flash, or other types of memories, for example, used for storing image data. The quasi-vertical edge detection module 120 is coupled to the storage unit 110 for reading or receiving at least one image stored in the storage unit 110.

Moreover, the quasi-vertical edge detection module 120, the intersection determination module 130, the position determination module 140, and the obstacle detection module 150 may be implemented by means of software, hardware, or a combination of the foregoing. However, it is noted that the invention is not limited thereto. The software may be a source code, application software, driver program, or a software module or function specialized for achieving a specific function, for example. The hardware is a central processing unit (CPU), a programmable controller, a digital signal processor (DSP), or other programmable microprocessors for general use or specific use, for example. For example, the quasi-vertical edge detection module 120, the intersection determination module 130, the position determination module 140, and the obstacle detection module 150 are computer programs or commands to be loaded to a processor of the obstacle detection device 100 for executing the function of obstacle detection.

Figure 3:
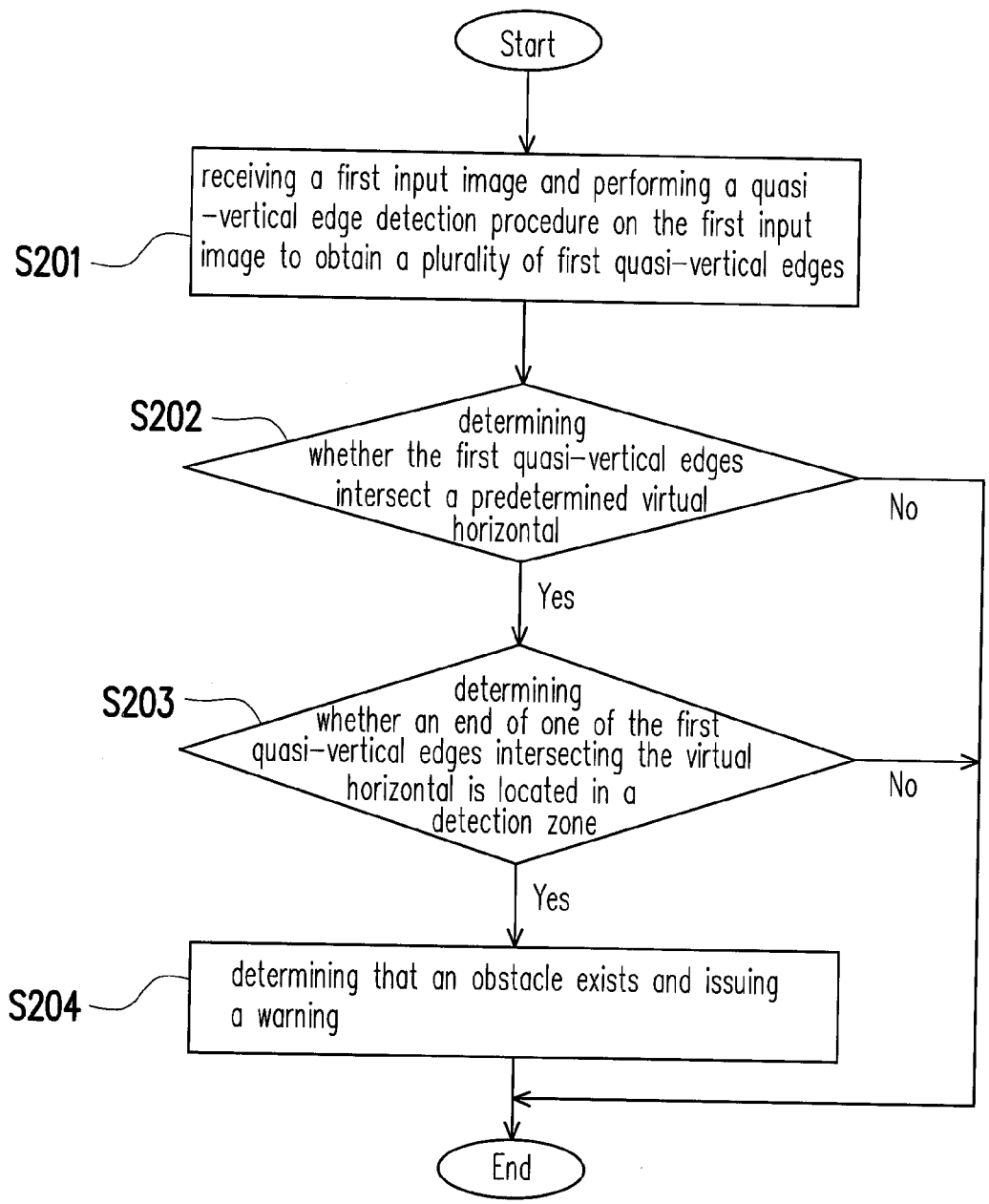
FIG. 3 is a flowchart illustrating an obstacle detection method according to an embodiment of the invention.

FIG. 3 is a flowchart illustrating an obstacle detection method according to an embodiment of the invention. Referring to FIG. 2 and FIG. 3, in this embodiment, the obstacle detection method is executed by the obstacle detection device 100 of FIG. 2, for example. Steps of the obstacle detection method of this embodiment are explained below with reference to the components of the obstacle detection device 100.

First, in Step S201, the quasi-vertical edge detection module 120 receives an input image and performs a quasi-vertical edge detection procedure on the input image to obtain a plurality of quasi-vertical edges. More specifically, the quasi-vertical edge detection is used to detect edges with edge directions similar to or the same as the vertical direction in the image, wherein the vertical direction is perpendicular to a horizontal direction. In particular, in this embodiment, an angle between the edge direction of the quasi-vertical edge and the vertical direction is smaller than an angle threshold, and this angle threshold may be determined depending on the actual situation. The invention is not intended to limit the angle value.

Further, in an embodiment, the quasi-vertical edge detection module 120 includes a first direction edge detection and a second direction edge detection, for example, so as to obtain a plurality of first direction edges and a plurality of second direction edges. The quasi-vertical edge detection module 120 obtains the quasi-vertical edges according to an angle relationship between the first direction edges and the second direction edges. It is noted that the directions to which the first direction edge detection and the second direction edge detection respectively correspond are not the same but are known parameters. Therefore, the quasi-vertical edge detection module 120 can analyze the angle relationship between the first direction edges and the second direction edges to obtain the directionality of each edge in the image, and further to obtain the quasi-vertical edges through the edge directions in the image. In other words, when executing the edge detection procedure, the quasi-vertical edge detection module 120 may use different masks to perform edge detection of different directionality. However, the invention is not intended to limit the directions to which the first direction edge detection and the second direction edge detection respectively correspond, and the directions may be determined according to the actual situations and demands.

For example, the first direction edge detection may be a horizontal edge detection while the second direction edge detection may be a vertical edge detection. Thus, in an embodiment, the quasi-vertical edge detection module 120 may use Sobel masks of different directionality to calculate an edge value of the horizontal direction and an edge value of the vertical direction. Hence, the quasi-vertical edge detection module 120 not only uses the edge value of the horizontal direction and the edge value of the vertical direction to detect the edges in the image but also uses a ratio of the edge value of the horizontal direction and the edge value of the vertical direction to analyze the directionality of the edges. The quasi-vertical edge detection module 120 may detect the quasi-vertical edges in the image based on the directionality of the edges. However, it is noted that the invention is not limited to the above embodiments. Any algorithm suitable for detecting edge directionality may be used in the invention. For example, the quasi-vertical edge detection module 120 may also use a Prewitt mask to perform the quasi-vertical edge detection of this embodiment.

Thereafter, in Step S202, the intersection determination module 130 determines whether the quasi-vertical edges intersect a predetermined virtual horizontal. The virtual horizontal is a reference line preset in the image and a position of the virtual horizontal in the image may be set according to the actual situation. In addition to directly determining whether the quasi-vertical edges pass through the virtual horizontal, the intersection determination module 130 for example uses the virtual horizontal as the reference line to define an image zone including the virtual horizontal. For example, a zone within ten pixels above and below the virtual horizontal may serve as the image zone for detecting whether the quasi-vertical edges intersect the virtual horizontal. If a portion of the quasi-vertical edge is located in this image zone, the intersection determination module 130 determines that this quasi-vertical edge intersects the virtual horizontal.

It is noted that, before the intersection determination module 130 determines whether the quasi-vertical edges intersect the virtual horizontal, the quasi-vertical edge detection module 120 further groups a plurality of quasi-vertical edges that are close to each other. More specifically, the quasi-vertical edge detection module 120 is aware of whether one quasi-vertical edge and another quasi-vertical edge are close to each other according to the positions of these quasi-vertical edges and groups a plurality of first quasi-vertical edges that are close to each other. Simply put, the quasi-vertical edges of one obstacle may be integrated or combined through this step, so as to reduce the calculation that the intersection determination module 130 performs to determine whether the quasi-vertical edges intersect the virtual horizontal.

If one of the first quasi-vertical edges intersects the virtual horizontal, in Step S203, the position determination module 140 determines whether an end of one of the quasi-vertical edges intersecting the virtual horizontal is located in a detection zone. More specifically, the position determination module 140 determines whether one end of one of the quasi-vertical edges intersecting the virtual horizontal is located in the detection zone according to position information of the quasi-vertical edges. This step further determines whether an object associated with the quasi-vertical edge intersecting the virtual horizontal is an obstacle hindering the driving of the vehicle. To be more specific, the position determination module 140 further identifies the obstacle that is close enough to the vehicle by Step S203. Because objects that are too far away from the vehicle do not hinder the driving of the vehicle, the position determination module 140 excludes the objects that are too far away from the vehicle. That is, since the edges of the distant object in the image do not fall in the detection zone of this embodiment, the obstacle detection device 100 determines whether one end of the quasi-vertical edge is located in the detection zone to distinguish the obstacle from the distant object.

Therefore, if one end of one of the first quasi-vertical edges intersecting the virtual horizontal is located in the detection zone, in Step S204, the obstacle detection module 150 determines that the obstacle exists and issues a warning. The obstacle detection module 150 issues the warning, for example, by performing one of the following: showing text, outputting a sound, emitting light, or performing a combination of the foregoing. Nevertheless, the invention is not limited thereto. The obstacle detection module 150 may change how the warning is presented according to the actual requirements.

Figure 4:
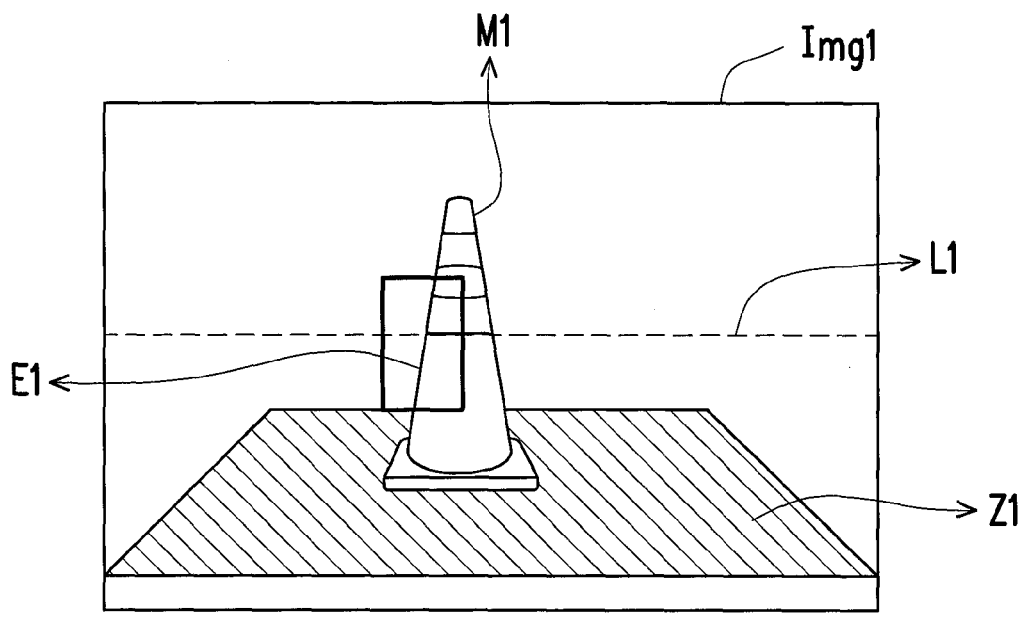
FIG. 4 is a schematic diagram illustrating a situation of obstacle detection according to an embodiment of the invention.

FIG. 4 is a schematic diagram illustrating a situation of obstacle detection according to an embodiment of the invention. Referring to FIG. 4, it is given that an image Img1 is a vehicle front image captured by the image capturing unit disposed on the vehicle, and an object M1 is present in the image Img1. First, the obstacle detection device performs the quasi-vertical edge detection procedure on the image Img1. In the example shown in FIG. 4, the obstacle detection device at least detects a quasi-vertical edge E1 and determines that the quasi-vertical edge E1 intersects a virtual horizontal L1. As shown in FIG. 4, the quasi-vertical edge is an edge which direction is similar to the vertical direction. In addition, the obstacle detection device also determines that one end of the quasi-vertical edge E1 is located in a detection zone Z1. Based on the above, because the quasi-vertical edge E1 intersects the virtual horizontal L1 and one end thereof is located in the detection zone Z1, the obstacle detection device determines that an obstacle exists near the vehicle and issues a warning to the driver.

Figure 5:
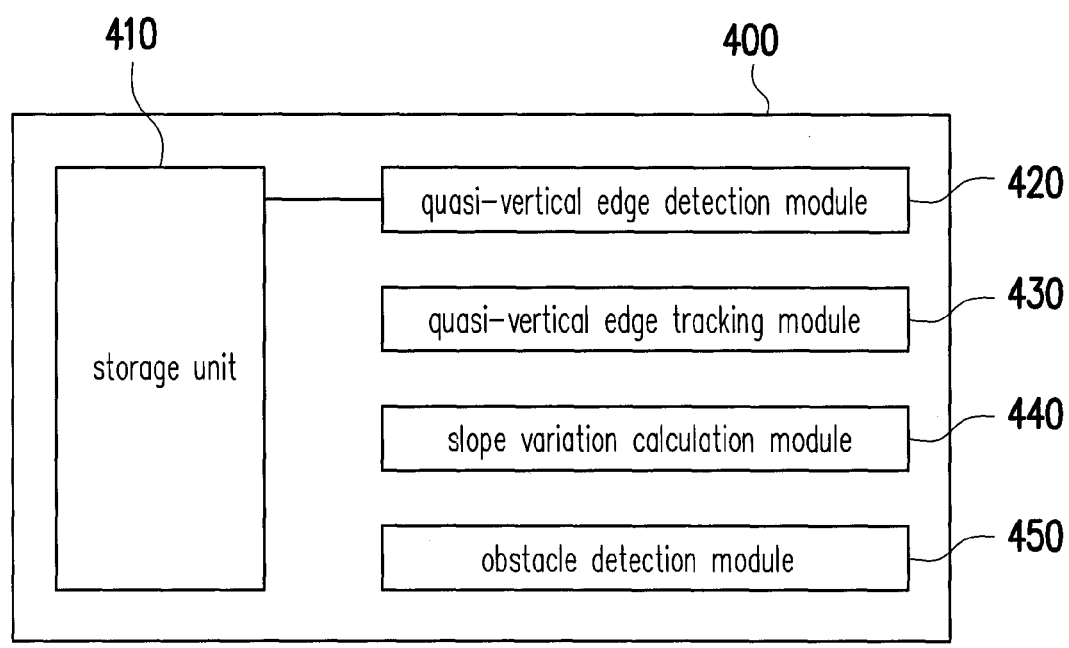
FIG. 5 is a block diagram illustrating an obstacle detection device according to another embodiment of the invention.

FIG. 5 is a block diagram illustrating an obstacle detection device according to another embodiment of the invention. As shown in FIG. 5, an obstacle detection device 400 includes a storage unit 410, a quasi-vertical edge detection module 420, a quasi-vertical edge tracking module 430, a slope variation calculation module 440, and an obstacle detection module 450. The storage unit 410 is the same as or similar to the storage unit 110 of the previous embodiment and thus details are not repeated hereinafter.

Further, in this embodiment, the quasi-vertical edge detection module 410 is coupled to the storage unit 410 to receive a plurality of images in a video stream. The quasi-vertical edge tracking module 430 is coupled to the quasi-vertical edge detection module 410 for tracking edges in the images. The quasi-vertical edge detection module 420, the quasi-vertical edge tracking module 430, the slope variation calculation module 440, and the obstacle detection module 450 may be implemented by software, hardware, or a combination of the foregoing. Nevertheless, the invention is not limited thereto.

The software is a source code, application software, driver program, or a software module or function specialized for achieving a specific function, for example. The hardware is a central processing unit (CPU), a programmable controller, a digital signal processor (DSP), or other programmable microprocessors for general use or specific use, for example. For example, the quasi-vertical edge detection module 420, the quasi-vertical edge tracking module 430, the slope variation calculation module 440, and the obstacle detection module 450 may be a computer program or command, for example, which may be loaded to a processor of the obstacle detection device 400 for executing the function of obstacle detection.

Figure 6:
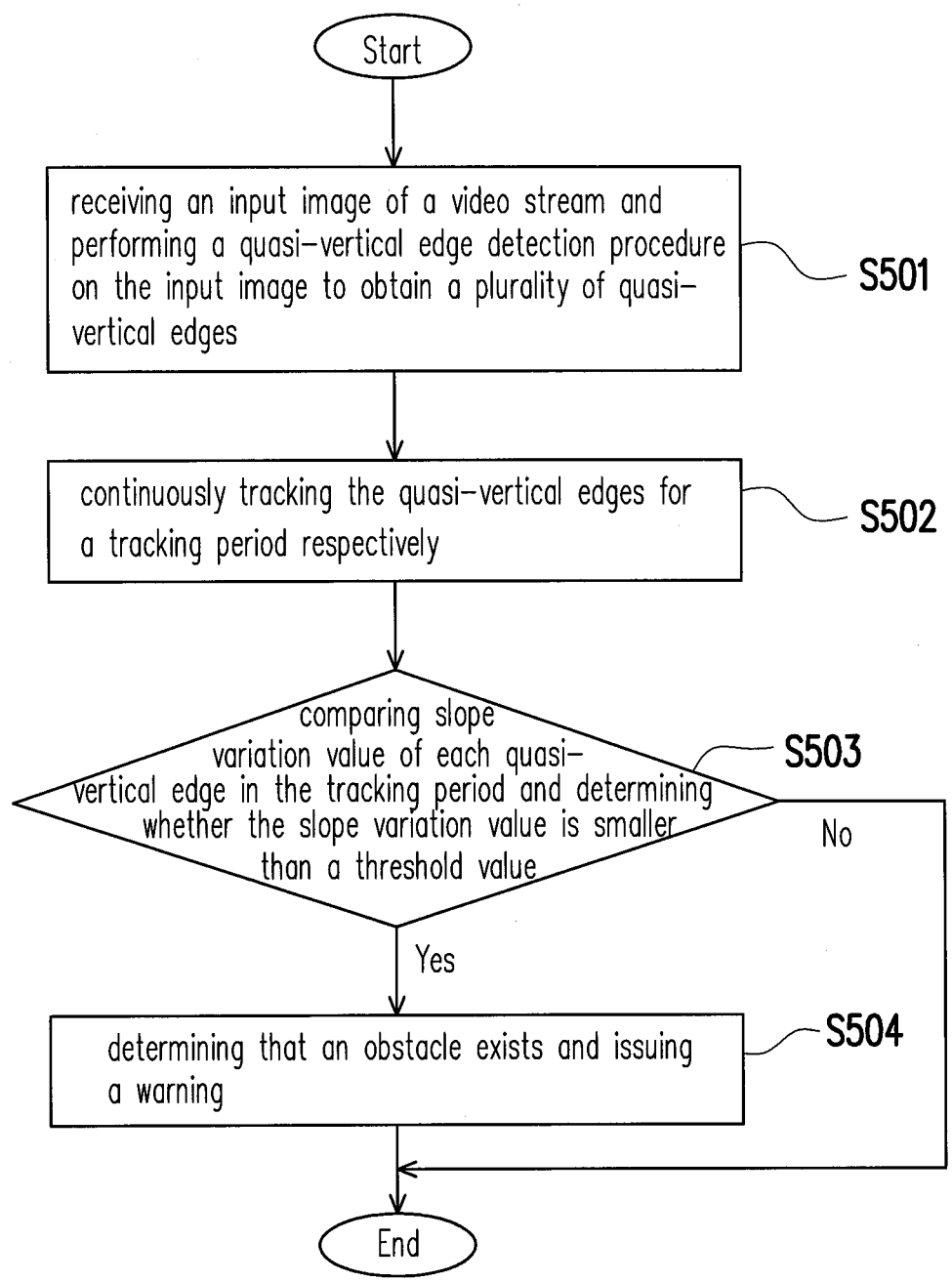
FIG. 6 is a flowchart illustrating an obstacle detection method according to another embodiment of the invention.

FIG. 6 is a flowchart illustrating an obstacle detection method according to another embodiment of the invention. Referring to FIG. 5 and FIG. 6, in this embodiment, the obstacle detection method is executed by using the obstacle detection device 400 of FIG. 5, for example. Steps of the obstacle detection method of this embodiment are explained below with reference to the components of the obstacle detection device 400.

First, in Step S501, the quasi-vertical edge detection module 420 receives an input image of a video stream and performs a quasi-vertical edge detection procedure on the input image to obtain a plurality of quasi-vertical edges. Simply put, the quasi-vertical edge detection module 420 obtains the video stream from the storage unit 410, and this video stream includes a plurality of images that are captured continuously. The quasi-vertical edge detection module 420 performs a quasi-vertical edge detection on the images included in the video stream, so as to obtain a plurality of quasi-vertical edges in each of the images. Details of the quasi-vertical edge detection module 420 executing the quasi-vertical edge detection are similar to those of the quasi-vertical edge detection module 120 of the previous embodiment and thus are not repeated hereinafter. In an embodiment, the quasi-vertical edge detection module 420 may perform the quasi-vertical edge detection on each image to obtain a quasi-vertical edge image corresponding to each image, wherein each quasi-vertical edge image includes a plurality of quasi-vertical edges.

Next, in Step S502, the quasi-vertical edge tracking module 430 continuously tracks the quasi-vertical edges for a period of tracking period respectively. In Step S503, the slope variation calculation module 440 compares a slope variation value of each quasi-vertical edge in the tracking period and determines whether the respective slope variation value is smaller than a threshold value. More specifically, in order to compare corresponding quasi-vertical edges in different images, the quasi-vertical edge tracking module 430 continuously tracks the quasi-vertical edges for the tracking period respectively. In addition, the slope variation calculation module 440 compares the slopes of the corresponding quasi-vertical edges in different images and determines whether the slope variation value is smaller than the threshold value.

In an embodiment, the quasi-vertical edge tracking module 430 and the slope variation calculation module 440 tracks the quasi-vertical edges and compares the slopes of the corresponding quasi-vertical edges by using a histogram of oriented gradient (HOG). To be more specific, the quasi-vertical edge images may be divided into a plurality of cells, and a characteristic value of each pixel point may be used to establish the HOG of each cell by statistics. Accordingly, by comparing the HOGs of the cells, the quasi-vertical edge tracking module 430 obtains the cells that represent the same scenery/object in different images to match the corresponding cells in different images, thereby achieving the purpose of tracking the quasi-vertical edges.

The slope variation calculation module 440 compares statistical results of the HOGs to determine whether the slope variation value is smaller than the threshold value. Furthermore, through statistics of the HOGs, the slope variation calculation module 440 obtains an angle value corresponding to a most significant bin in each HOG. Based on the above, by comparing the angle values corresponding to the most significant bins of the corresponding cells, the slope variation calculation module 440 obtains the slope variation of each quasi-vertical edge.

Regarding the lane line on the road, it is noted that the edges of the lane line change directions with the turning of the vehicle. By contrast, the edges of the obstacle do not change directions as the vehicle turns. Therefore, the obstacle detection device analyzes and compares the slope variations of the quasi-vertical edges in the tracking period to determine whether an obstacle is detected. In other words, based on the slope variation values of the quasi-vertical edges, the obstacle detection device distinguishes three-dimensional objects and planar objects in the images, wherein the planar objects may not hinder the driving of the vehicle. Therefore, if one of the slope variation values is smaller than the threshold value, in Step S504, the obstacle detection module 450 determines that the obstacle exists and issues a warning.

Figure 7A:
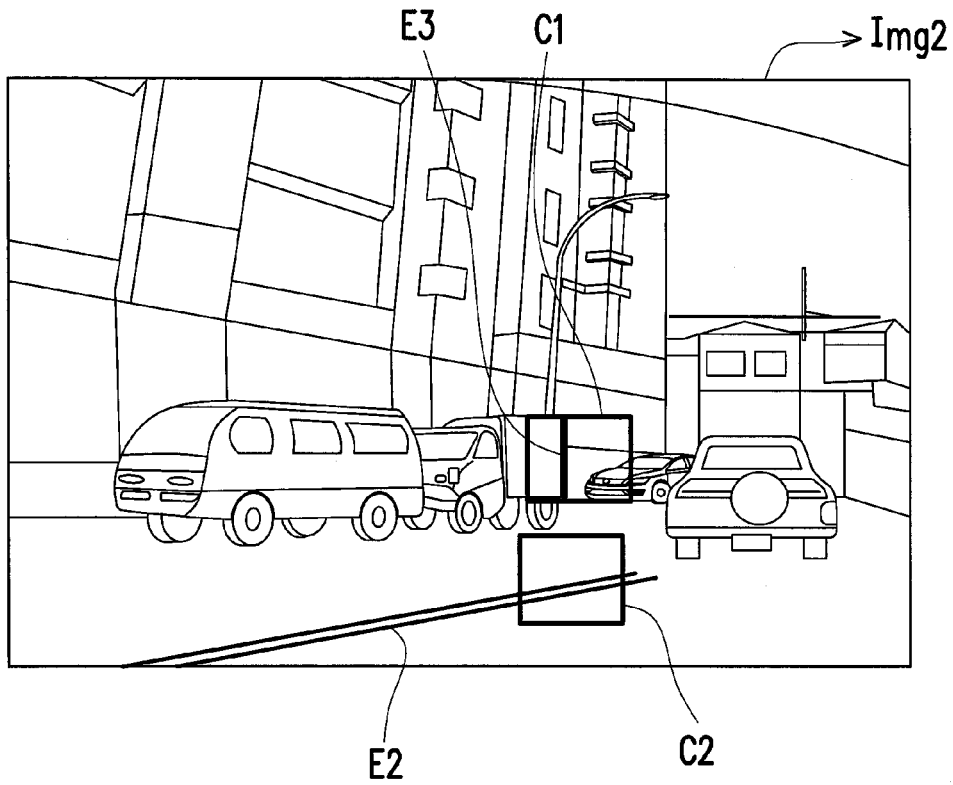
FIG. 7A and FIG. 7B are schematic diagrams illustrating situations of obstacle detection according to an embodiment of the invention.
Figure 7B:
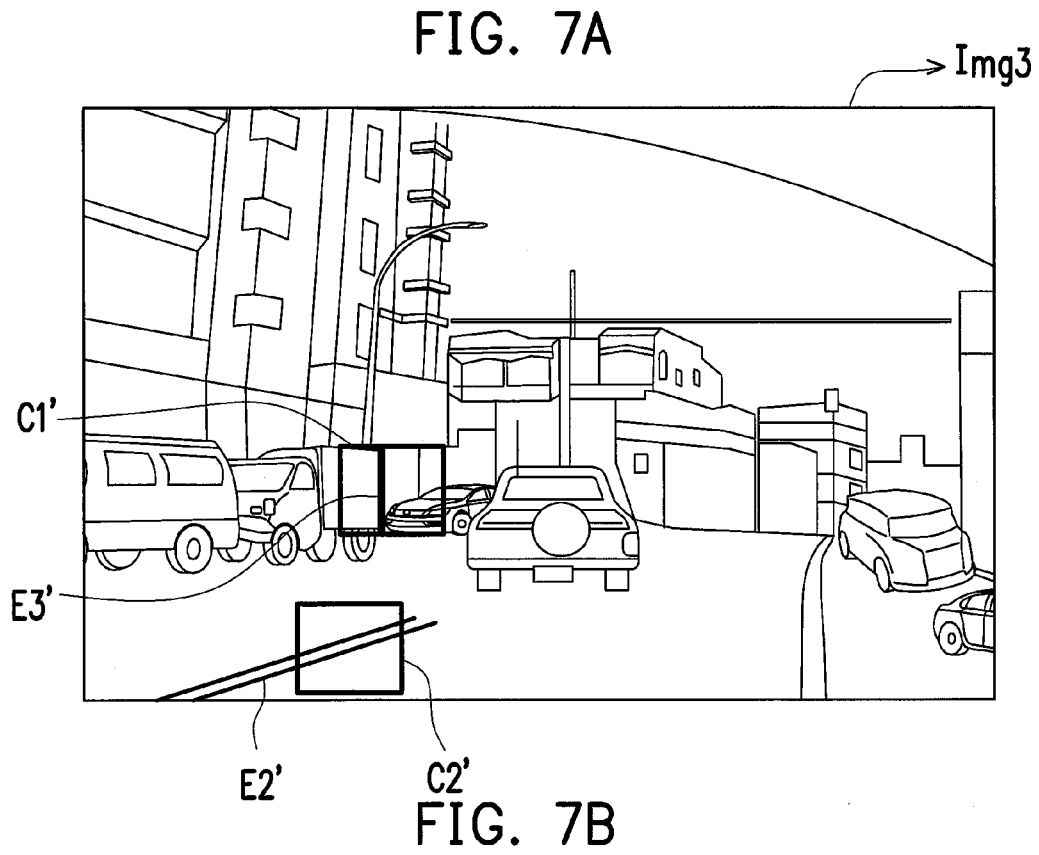

FIG. 7A and FIG. 7B are schematic diagrams illustrating situations of obstacle detection according to an embodiment of the invention. With reference to FIG. 7A and FIG. 7B, it is given that the video stream captured by the image capturing unit on the vehicle includes an image Img2 and an image Img3, which are obtained when the vehicle turns. That is to say, the image Img2 and the image Img3 are vehicle front images captured by the image capturing unit on the vehicle at different times, and a capturing time of the image Img2 is earlier than a capturing time of the image Img3. From the scenery/object in the image Img2 and the image Img3, it is known that the vehicle is in a state of turning to the right, for example.

First, the obstacle detection device performs the quasi-vertical edge detection procedure on the image Img2 and the image Img3 respectively. In the example shown in FIG. 7A and FIG. 7B, the obstacle detection device at least detects a quasi-vertical edge E2 and a quasi-vertical edge E3 of the image Img2, and the obstacle detection device at least detects a quasi-vertical edge E2' and a quasi-vertical edge E3' of the image Img3. Further, based on calculation of the HOG, the obstacle detection device is aware that a cell C1 of the image Img2 and a cell C1' of the image Img3 correspond to each other, and the obstacle detection device is aware that a cell C2 of the image Img2 and a cell CT of the image Img3 correspond to each other.

Then, by comparing the HOG of the cell C1 with the HOG of the cell C1', the obstacle detection device determines whether the slope variation value between the quasi-vertical edge E3 and the quasi-vertical edge E3' is greater than the threshold value. Likewise, by comparing the HOG of the cell C2 with the HOG of the cell C2', the obstacle detection device determines whether the slope variation value between the quasi-vertical edge E2 and the quasi-vertical edge E2' is greater than the threshold value.

In this example, the quasi-vertical edge E3 and the quasi-vertical edge E3' are edges associated with the obstacle at front, and the quasi-vertical edge E2 and the quasi-vertical edge E2' are edges associated with the edges of the lane line. As shown in FIG. 7A and FIG. 7B, when the vehicle turns, the slope variation between the quasi-vertical edge E3 and the quasi-vertical edge E3' is not large. By contrast thereto, when the vehicle turns, the slope variation between the quasi-vertical edge E2 and the quasi-vertical edge E2' is very obvious. Based on the above, the obstacle detection device only identifies the quasi-vertical edge E3 and the quasi-vertical edge E3' as edges corresponding to the obstacle. That is, the obstacle detection device compares the slope variation value of each quasi-vertical edge in the tracking period to determine whether the obstacle exists.

Figure 8:
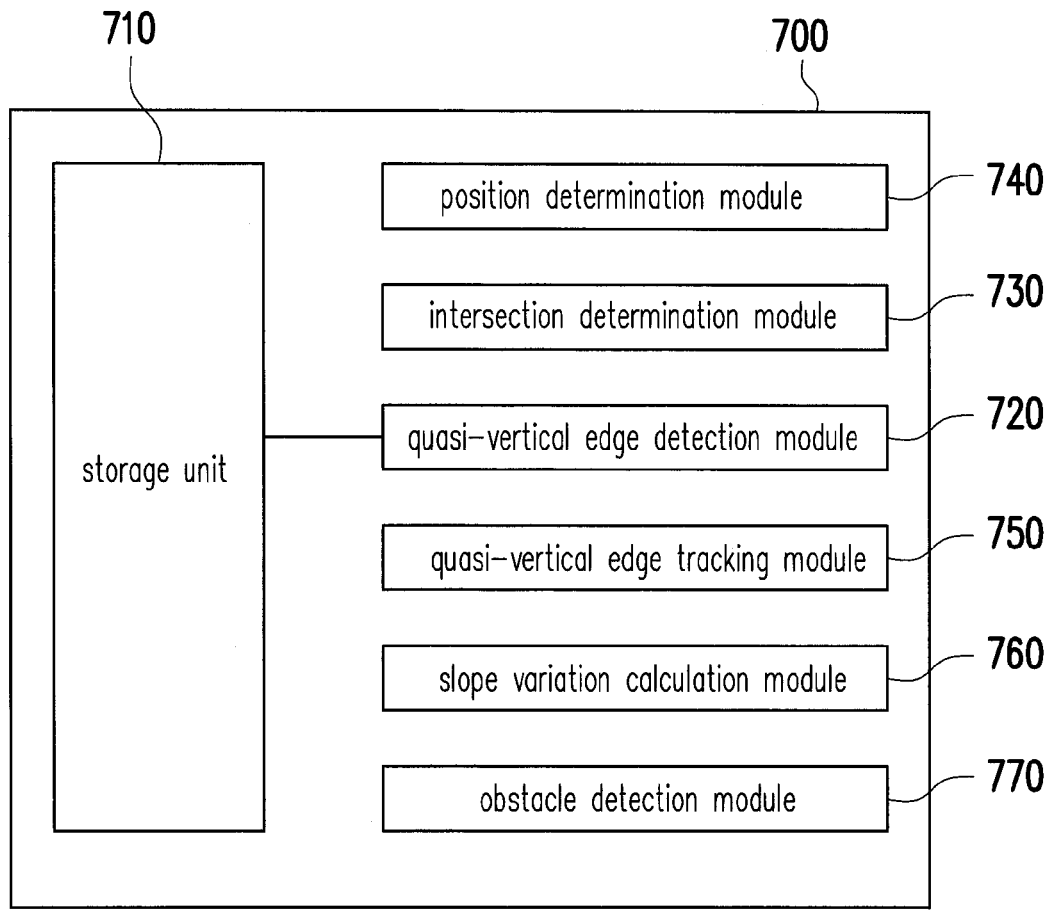
FIG. 8 is a block diagram illustrating an obstacle detection device according to yet another embodiment of the invention.

FIG. 8 is a block diagram illustrating an obstacle detection device according to yet another embodiment of the invention. Referring to FIG. 8, an obstacle detection device 700 includes a storage unit 710, a quasi-vertical edge detection module 720, an intersection determination module 730, a position determination module 740, a quasi-vertical edge tracking module 750, a slope variation calculation module 760, and an obstacle detection module 770. The foregoing components are the same as or similar to those described in the embodiments of FIG. 2 and FIG. 5 and can be inferred by those skilled in the art with reference to the descriptions of FIG. 2 and FIG. 5. Thus, details of these components are not repeated hereinafter.

Figure 9:
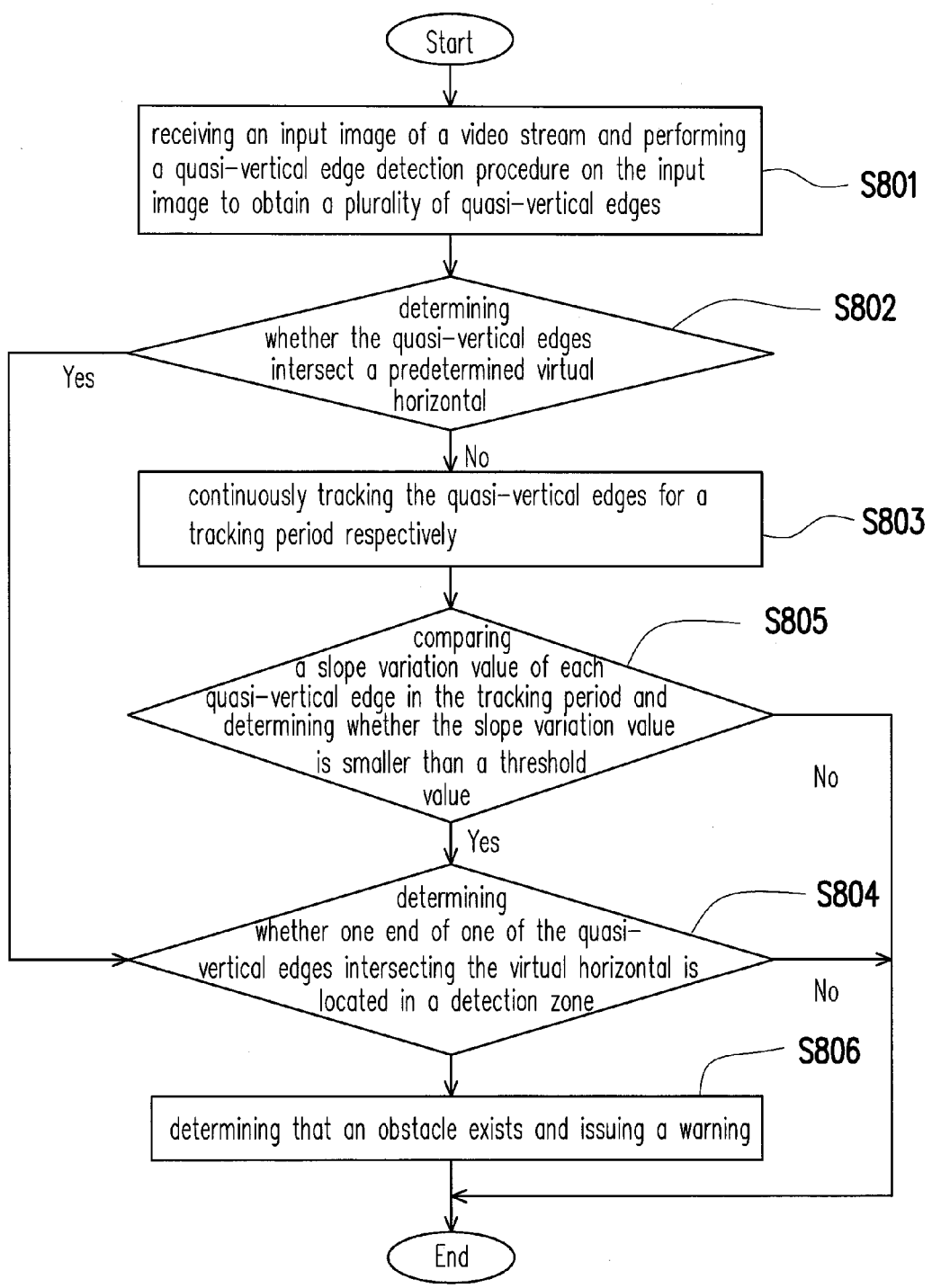
FIG. 9 is a flowchart illustrating an obstacle detection method according to yet another embodiment of the invention.

FIG. 9 is a flowchart illustrating an obstacle detection method according to yet another embodiment of the invention. Referring to FIG. 8 and FIG. 9, in this embodiment, the obstacle detection method is executed by using the obstacle detection device 700 of FIG. 8, for example. Moreover, in this embodiment, the obstacle detection device simultaneously performs the obstacle detection based on one single image and multiple images in the video stream, so as to increase the accuracy of obstacle detection. Steps of the obstacle detection method of this embodiment are explained below with reference to the components of the obstacle detection device 700.

In Step S801, the quasi-vertical edge detection module 720 receives an input image of a video stream and performs a quasi-vertical edge detection procedure on the input image to obtain a plurality of quasi-vertical edges. In Step S802, the intersection determination module 730 determines whether the quasi-vertical edges intersect a predetermined virtual horizontal. If it is determined negative in Step S802, in Step S803, the quasi-vertical edge tracking module 750 continuously tracks the quasi-vertical edges for a tracking period respectively.

Then, in Step S805, the slope variation calculation module 760 compares a slope variation value of each quasi-vertical edge in the tracking period and determines whether the respective slope variation value is smaller than a threshold value. If it is determined affirmative in Step S805 or Step S802, in Step S804, the position determination module 740 determines whether one end of one of the quasi-vertical edges intersecting the virtual horizontal is located in a detection zone and determines whether one end of one of the quasi-vertical edges corresponding to the slope variation value smaller than the threshold value is located in the detection zone. If it is determined affirmative in Step S804, in Step S806, the obstacle detection module 770 determines that the obstacle exists and issues a warning. Details of the above Steps S801 to S806 may be inferred from the descriptions of FIG. 1 to FIG. 7 and thus are not repeated hereinafter.

To sum up, the obstacle detection device in an embodiment of the invention performs the obstacle detection by image processing. The obstacle detection device detects edges that are similar to the vertical line but not completely vertical by edge detection of different directionality and utilizes information generated from the quasi-vertical edges to determine whether an obstacle exists. Accordingly, through detection of the quasi-vertical edges, misjudgment resulting from complicated edge information or specific edge characteristics is prevented and the accuracy of obstacle identification is improved. Further, during the process of using the quasi-vertical edges to detect the obstacle, the invention utilizes the video stream, generated by single photography device, to distinguish three-dimensional objects and planar objects in the image. In comparison with the 3D vision technology that requires multiple photography devices, the invention reduces the costs and the amount of calculation significantly.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. An obstacle detection device, comprising:
a storage unit at least storing an image;
a quasi-vertical edge detection module coupled to the storage unit to receive an input image and perform a quasi-vertical edge detection procedure on the input image to obtain a plurality of quasi-vertical edges;
an intersection determination module determining whether each of the quasi-vertical edges intersects a virtual horizontal served as a horizon line in the image and dividing the image into a above-horizon zone and a below-horizon zone;
a position determination module determining whether an end of one of the quasi-vertical edges intersecting the virtual horizontal is located in a detection zone according to position of the end of the one of the quasi-vertical edges and range of the detection zone if the one of the quasi-vertical edges intersects the virtual horizontal, wherein the detection zone is located within the below-horizon zone which is below the virtual horizontal; and
an obstacle detection module determining that an obstacle exists and issuing a warning if the end of the one of the quasi-vertical edges intersecting the virtual horizontal is located in the detection zone.

2. The obstacle detection device according to claim 1, wherein the quasi-vertical edge detection module comprises a first direction edge detection and a second direction edge detection to obtain a plurality of first direction edges and a plurality of second direction edges and obtain the quasi-vertical edges according to an angle relationship between the first direction edges and the second direction edges.

3. The obstacle detection device according to claim 1, wherein the quasi-vertical edge detection module groups the quasi-vertical edges that are close to each other.

4. The obstacle detection device according to claim 2, wherein the first direction edge detection of the quasi-vertical edge detection module is a horizontal edge detection and the second direction edge detection is a vertical edge detection.

5. An obstacle detection device, comprising:
a storage unit at least storing a video stream comprising a plurality of images continuously captured during a tracking period;
a quasi-vertical edge detection module coupled to the storage unit to receive an input image of the video stream and perform a quasi-vertical edge detection procedure on the input image to obtain a plurality of quasi-vertical edges;

a quasi-vertical edge tracking module coupled to the quasi-vertical edge detection module and continuously tracking the quasi-vertical edges for the tracking period respectively;

a slope variation calculation module comparing a slope variation value of each of the quasi-vertical edges in the tracking period and determining whether the slope variation value is smaller than a threshold value, wherein the slope variation calculation module compares a slope of one of quasi-vertical edges in one of the images with another slope of another one of quasi-vertical edges corresponding to the one of quasi-vertical edges in another one of the images, so as to obtain the slope variation value of each of the quasi-vertical edges; and an obstacle detection module determining that an obstacle exists and issuing a warning if one of the slope variation values is smaller than the threshold value.

6. The obstacle detection device according to claim 5, wherein the quasi-vertical edge detection module comprises a first direction edge detection and a second direction edge detection to obtain a plurality of first direction edges and a plurality of second direction edges and obtain the quasi-vertical edges according to an angle relationship between the first direction edges and the second direction edges.

7. The obstacle detection device according to claim 5, wherein the quasi-vertical edge detection module groups the quasi-vertical edges that are close to each other and have similar slopes.

8. The obstacle detection device according to claim 6, wherein the first direction edge detection of the quasi-vertical edge detection module is a horizontal edge detection and the second direction edge detection is a vertical edge detection.

9. The obstacle detection device according to claim 1, wherein the quasi-vertical edge detection module uses a ratio of a edge value of a horizontal direction and a edge value of the vertical direction to analyze the directionality of a plurality of edges, so as to obtain the quasi-vertical edges from the edges in the input image.

* * * * *